United States Patent [19]

Schapira et al.

[11] Patent Number: 5,203,906
[45] Date of Patent: Apr. 20, 1993

[54] ANTI-CLUMPING PRODUCTS, COMPOSITIONS AND TREATMENTS FOR SALTS, SIMPLE AND COMPLEX FERTILIZERS

[75] Inventors: Joseph Schapira, Paris; Jean-Claude Cheminaud, Herblay; Pascal Petitbon, Gennevilliers; Daniel Chaillou, Sannois, all of France

[73] Assignee: Compagnie Francaise de Produits Industriels, Gennevilliers Cedex, France

[21] Appl. No.: 797,153

[22] Filed: Nov. 26, 1991

Related U.S. Application Data

[63] Continuation of Ser. No. 334,437, Apr. 7, 1989, abandoned.

[30] Foreign Application Priority Data

Apr. 7, 1988 [FR] France .................. 88 04614

[51] Int. Cl.$^5$ .............................................. C05G 3/10
[52] U.S. Cl. .................. 71/64.12; 71/64.13; 252/49.5; 106/213
[58] Field of Search ............... 71/64.12, 64.13, 1, 71/11, 27; 252/49.5; 106/213

[56] References Cited

U.S. PATENT DOCUMENTS

| 4,183,766 | 1/1980 | Woodward ................. 106/213 |
| 4,374,039 | 2/1983 | Schapira et al. .......... 71/64.03 X |
| 4,582,543 | 4/1986 | Bretz ...................... 252/49.5 |
| 4,702,854 | 10/1987 | Snyder, Jr. et al. ...... 252/32.7 E |

FOREIGN PATENT DOCUMENTS

| 1205624 | 6/1986 | Canada ....................... 71/64.12 |
| 0048226 | 3/1982 | European Pat. Off. ........ 71/64.12 |
| 742636 | 12/1955 | United Kingdom . |

OTHER PUBLICATIONS

Chemical Abstracts, vol. 102, No. 19, p. 547, No. 165899.

Primary Examiner—Ferris Lander
Attorney, Agent, or Firm—Keck, Mahin & Cate

[57] ABSTRACT

An anti-clumping product for salts and for simple and complex fertilizers is essentially constituted by a combination of one or several amine salts of alkylary-1-sulfonic acids and of one or several amine salts of acid phosphate esters, in the presence possibly of an excess of amine.

19 Claims, 1 Drawing Sheet

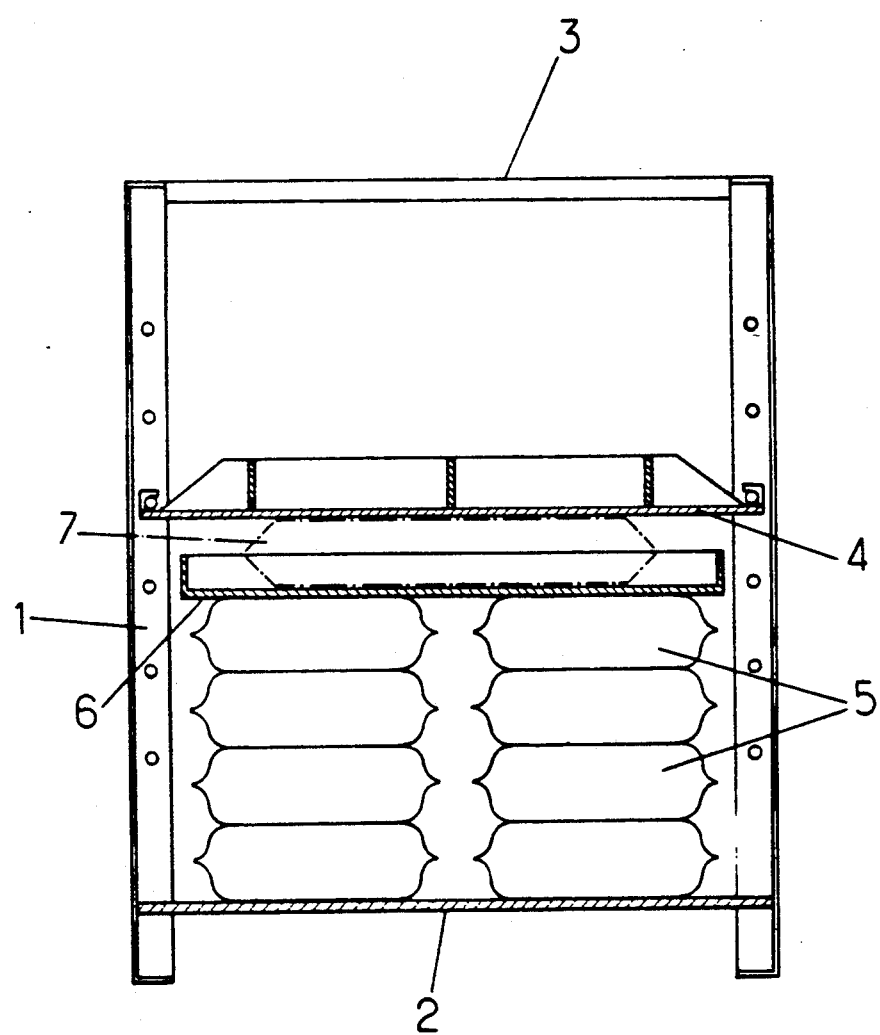

ANTI-CLUMPING PRODUCTS, COMPOSITIONS AND TREATMENTS FOR SALTS, SIMPLE AND COMPLEX FERTILIZERS

This application is a continuation of application Ser. No. 07/334,437, filed Apr. 7, 1989, now abandoned.

The invention relates to anti-clumping products, compositions and treatments for preventing the setting solid of salts and of simple and complex fertilizers.

Among the salts and simple fertilizers concerned by the invention, may be mentioned nitrogenous salts such as ammonium, potassium and calcium nitrates as well as mono-ammonium and diammonium sulphates and fertilizers containing urea.

Complex fertilizers are binary or ternary mixtures of elements of the group constituted by nitrogen, phosphorus or potassium; these fertilizers are identified by formulae of the type $N_x P_y K_z$ in which x, y, z represent numbers which denote respectively the percentages of nitrogen, phosphoric anhydride and $K_2O$ constituting the complex fertilizer.

All fertilizers undergo generally a setting solid or clumping during storage.

The tendency to clumping is greater or less according to:
- the method of granulation, the grain occurring in the form of granules, grains, beads, spherules, small cylinders or prills; the fertilizer can also be compacted,
- the origin of the constituent raw materials of the fertilizer,
- the nature of the additives introduced into the mass before granulation.

Among the numerous factors which influence clumping may be mentioned:
- the intrinsic humidity of the fertilizer as well as the outside humidity,
- the temperature,
- the storage time,
- the storage pressure,
- the structural polymorphisme particularly the phase transitions of ammonium nitrate,
- the physical form and chemical composition of the grain.

The setting solid can sometimes reach proportions such that the fertilizer takes the form of a hard, compact mass or of large blocks extremely difficult to break up; the fertilizer is then no longer utilizable as such. In the case of a storage in a silo, the setting solid may be such that the crust formed must be broken by heavy mechanical means. The storage, handling and spreading of the fertilizer are rendered more difficult, the setting solid then resulting in a considerable and unacceptable additional economic expense.

To combat the setting solid, it has been proposed to resort to organic substances such as anionic and cationic surface-active agents, formulated into oily or waxy derivatives and associated possibly with other substances such as certain polymers or non-ionic surface-active agents.

Among the cationic surface-active agents proposed, may be mentioned aminated oils.

Among the anionic surface-active agents already proposed, may be mentioned
- amine alkylaryl-sulfonates whose application is described in French Patent No. 2,460,706 belonging to the Assignee,
- amino salts of acid phosphate esters whose application in association with a mineral oil, a microcrystalline wax and a macrocrystalline wax, is described in European Patent No. 113 687, as well as
- potassium salts of acid phosphate esters whose use is described in U.S.S.R. Patent No. SU 1,131,859.

These products according to the prior art generally give satisfaction but, in face of the always increasing demands of users, Applicants have pursued their research in order to develop still more effective products.

And they have had the merit of finding that, surprisingly and unexpectedly, the simultaneous employment of two types of anti-clumping agents constituted respectively by amino salts of alkylaryl-sulfonic acids and amino salts of acid phosphate esters potentiated the anti-clumping properties of each of the two types of agents, which enables recourse to be had, in the case of their simultaneous utilization according to the invention, to an amount of active material less than that which is necessary to obtain the same anti-clumping effect when one or the other of the two types of agents is used alone, said simultaneous utilization permitting in addition, still for the same anti-clumping effect, the reduction, or even the elimination of coating charges generally necessary.

By means of the invention, it becomes possible to solve the problem of the setting solid of fertilizers very sensitive to the clumping phenomenon, such as ammonium nitrates containing sulphates in the mass or complex fertilizers.

It follows that the anti-clumping product according to the invention for salts and for simple and complex fertilizers is essentially constituted by a combination of one or several amino salts of alkylaryl-sulfonic acids and of one or several amino salts of acid phosphate esters, in the presence, as the case may require, of an excess of amine, said combination being producible by neutralization or "over-neutralization" of a mixture of the one or more alkylaryl-sulfonic acids and of the one or more acid phosphate esters by means of one or several amines.

By the term "alkylaryl-sulfonic acids", is meant mixtures of mono-, di- or trisulfonic acids of which the aromatic portion, preferably benzenic or naphthalenic, more particularly naphthalenic, is mono- or polyalkyl-substituted, the degree of substitution being an average degree corresponding to the alkyl/aryl molar ratios used for the synthesis, it being understood that, for each of the contemplated degrees of substitution, namely generally from 1 to 4, it is possible to have complex mixtures of isomers of sulfonic acids; preferably, the total number of carbon atoms of the alkyl portion does not exceed 16 in the mixtures concerned.

By way of example, it is indicated that, in the case of 1.3-isopropyl-naphthalene-sulfonic acid, the average molar ratio isopropyl/naphthalene is equal to 1.3.

By the term "esters of acid phosphates" which may be prepared by the direct reaction of a compound with a hydroxyl group such as an alcohol, alkylphenol or alkylnaphthol with, for example, phosphoric anhydride, the preferred ones are those which correspond to the following general formulae:

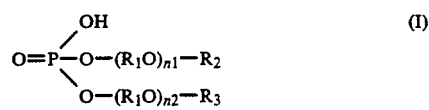

(I)

and

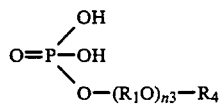
(II)

in which
R₁ represents an alkylene group having from 2 to 4 carbon atoms,
R₂, R₃ and R₄ represent an alkyl group having from 8 to 20 carbon atoms or an alkylaryl group of which the alkylated portion has from 8 to 12 carbon atoms, and
$n_1$, $n_2$ and $n_3$ represent a number from 0 to 15 and preferably from 0 to 5.

In general, the reaction recalled above for the preparation of these esters leads to mixtures of mono- and diesters.

For economic reasons, a mixture of compounds with a hydroxyl group is often chosen, for example a mixture of fatty alcohols.

For the preparation of the anti-clumping product according to the invention, a mixture of alkylaryl-sulfonic acids and of acid phosphates esters is formed, which mixture is then neutralized and even "over-neutralized" by one or several amines.

As amine, recourse is preferably had to alkylamines, cycloalkylamines or aromatic amines and possibly alkanolamines; said amines can be primary, secondary or tertiary.

The amine may be oxyalkylenated.

Advantageously, recourse is had to fatty alkylamines and preferably to alkylamines—or to mixtures of such amines—whose number of carbon atoms varies from 12 to 20; technical stearylamine or hydrogenated suet amine give good results.

When there is over-neutralization, the latter does not exceed 25% molar excess of amine and is preferably limited to 10%.

The invention also relates to anti-clumping compositions comprising, besides the abovesaid anti-clumping products according to the invention, at least one other anti-clumping product selected advantageously from the group of fatty acids and their salts as well as at least one formulation agent selected advantageously from the group comprising mineral oils and their mixtures with macrocrystalline waxes.

Among the fatty acids, recourse is advantageously had to those having 12 to 20 carbon atoms and preferably to stearic acid.

Among the salts of fatty acids, recourse is advantageously had to calcium or magnesium salts and preferably aluminum salts; still more particularly, recourse is had to an aluminum salt in which the molar ratio "aluminum/stearic acid" is in the vicinity of 2.

Generally oils with a paraffinic or naphthenic character are used, for example
the naphthenic oil marketed by the NYNAS Company under the trademark NYTEX and corresponding to the following specifications:

| | |
|---|---|
| density | 0.894 |
| kinematic viscosity at 40° C. | 23 cSt |
| hydrocarbon composition | |
| aromatic | 10% |
| naphthenic | 46% |
| paraffinic | 44%, ou | the paraffinic oil marketed by BP France under the trademark ENERPAR and corresponding to the following specifications:

| | |
|---|---|
| density | 0.925 |
| kinematic viscosity at 40° C. | 620 cSt |
| hydrocarbon composition | |
| aromatic | 12% |
| naphthenic | 22% |
| paraffinic | 66%. |

When the formulation is formed by means of a macrocrystalline wax, recourse is advantageously had to a paraffin wax having the following characteristics:

| | |
|---|---|
| melting point | 58–60° C. |
| kinematic viscosity at 100° C. | 9 cSt |
| penetration at 25° C. | 16 |
| blocking temperature | 40. |

The abovesaid anti-clumping compositions according to the invention are frequently of type I or II defined below in Table A and which differ from one another by the proportion of the constituents.

TABLE A

| Constituent in % weight | Composition of type I | Composition of type II |
|---|---|---|
| Anti-clumping product (according to the invention) | 5–35 | 60–100 |
| Fatty acid or one of its salts | 0–10 | 0–10 |
| Mineral oil | 20–90 | 0–30 |
| Macrocrystalline wax | 0–50 | 0–15 |

In types I and II, the anti-clumping product according to the invention comprises:
from 15 to 85% of alkylarylsulfonic acids,
from 85 to 15% of acid phosphates esters and preferably
from 30 to 70% of alkylarylsulfonic acids,
from 70 to 30% of acid phosphates esters.

The anti-clumping treatment according to the invention is characterized by the fact that there is incorporated with a salt, or with a simple or complex fertilizer, preferably at the exit from the drum or fluidized bed, the product to be treated having at that moment acquired almost all of its final mechanical properties, an effective amount of the anti-clumping product according to the invention, preferably employed in the form of anti-clumping composition according to the invention.

The abovesaid effective amount of product according to the invention is advantageously from 0.005 to 0.05% by weight with respect to the salt, or to the simple or complex fertilizer.

More particularly, there is incorporated with a salt, or with a simple or complex fertilizer,
either an anti-clumping composition of type I, by spraying, in an amount of 0.03 to 0.4% and, preferably, from 0.05 to 0.2% by weight with respect to the treated product; this spraying can be followed or preceded by coating by means of a charge of the group comprising chalk, infusorial earth, talc, clays or the like, or a so-called doped charge obtained by treatment by means of an anti-clumping composition of type II of a charge of the group comprising chalk, infusorial earth, talc, clays, the proportion of composition II with respect to the charge being from 1 to 10%, preferably from 1 to 6% by weight, the doped charge being employed by coating in the proportion of 0.1 to 1%, preferably from 0.2 to 0.6% by weight with respect to the treated product, it being understood that, in both cases, the proportion of anti-clumping product according to the invention introduced into the salts, or into the simple or complex fertilizers is comprised between 0.005 and 0.05% by weight with respect to the mass of salts, or of simple or complex fertilizers treated.

It is well known that it is not desirable to prepare the doped charge using substances containing too much oil.

The coating of a salt, or of a simple or complex fertilizer by means of a doped charge is generally followed by the spraying of an oil, vaseline or waxy products. Heavy fuel is also much used. These substances serve to stick on the charge and to avoid dust.

At the exit from the cooling drum or at the end of the fluidized bed, the temperature of the treated product is generally below 40° C. and often below 32° C., which corresponds for ammonium nitrate, to the transition temperature from phases IV to III which is well known to manufacturers. The humidity is generally, at this stage, less than 1%.

In certain particular cases, the anti-clumping treatment may be done on a fertilizer partly cooled between 80° and 40° C. The cooling is then continued after incorporation of the anti-clumping agent.

In the case of the employment of an anti-clumping composition of type I, the latter may be sprayed at a temperature of about 80° C. by a suitable system permitting its homogeneous distribution on the fertilizer; the coating amount whose possible application follows or preceeds that of the anti-clumping composition of type I, may reach 2% by weight with respect to the treated product but mostly does not exceed 0.5%.

Advantageously, the anti-clumping compositions according to the invention enable to avoid the use of mineral coatings whose influence on the rescattering of dust is well known.

To illustrate the anti-clumping properties of the products according to the invention, a certain number of comparative trials were carried out.

For these trials, a concrete mixer was used in which an anti-clumping treatment according to the invention was applied to 20 kg of fertilizer.

The fertilizer was then packaged in polyethylene bags and then stacked in a clumping module of the type illustrated by the single figure.

BRIEF DESCRIPTION OF FIGURE

The figure is a schematic elevational view, partly in cross-section, of a clumping module.

This clumping module comprises a metal framework constituted by uprights 1, a loading platform 2, cross braces 3 and a fixed platform 4.

Polyethylene bags 5, filled with product to be tested, were stacked as shown on the platform 2.

A platform 6 bearing a lifting cushion 7 was placed on the pile of bags. By inflating the cushion with compressed air between the moveable platform 6 and the fixed platform 4, pressure was transmitted to the pile of bags.

This applied pressure was variable and could simulate a pile of bags 12 m high.

The fertilizer was kept under pressure for a period of greater or shorter duration, generrally from 10 to 45 days, sometimes several months. At the end of the test, the bags were opened, the clumps were weighed and the hardness of the clumps was measured by means of a dynamometer.

The clumping is expressed as the percentage of clumps (between 0 and 100). Generally, the hardness of the clumps is comprised between 0 and 100 N but can reach 200N for untreated controls.

A clumping index is defined as being the product of the percentage of clumps multiplied by the hardness of the clumps.

Each measurement resulted from the average of several bags (generally 4 bags).

EXAMPLE 1

An anti-clumping treatment was applied to an NPK granulated complex fertilizer of formula 15.12.24 by using
  an anti-clumping composition A according to the invention,
  an anti-clumping composition B comprising one of the two agents entering into the constitution of the anti-clumping product of composition A,
  a composition C. comprising the other of the two agents entering into the constitution of the anti-clumping product of composition A,
  an anti-clumping composition according to the prior art.

The anti-clumping composition A was constituted
  in a proportion of 15% by weight of the product of neutralization of a mixture with 66% by weight of 1.3-isopropyl naphthalenesulfonic acid and 34% by weight of an acid laurylphosphate with 3 moles of ethylene oxide with stearylamine,
  in a proportion of 60% by weight of a mineral oil,
  in a proportion of 25% by weight of a macrocrystalline wax.

The anti-clumping composition B was constituted
  in a proportion of 15% by weight of the product of neutralization of 1.3-isopropyl naphthalenesulfonic acid with stearylamine,
  in a proportion of 60% by weight of a mineral oil,
  in a proportion of 25% by weight of a macrocrystalline wax.

The anti-clumping composition C was constituted
  in a proportion of 15% by weight of the product of neutralization of an acid laurylphosphate with 3 moles of ethylene oxide (50/50 molar mixture of mono- and diesters) with stearylamine,
  in a proportion of 60% by weight of a mineral oil,
  in a proportion of 25% by weight of a macrocrystalline wax.

The anti-clumping compositions A, B and C are applied by spraying at 80° C. in the proportion of 0.15% by weight with respect to the fertilizer, this application being preceded by the application of an inert clay in the proportion of 0.3% by weight with respect to the fertilizer.

The anti-clumping composition according to the prior art was constituted by a doped clay with 3% by weight of stearylamine. It was applied in the proportion of 0.6% by weight with respect to the fertilizer, this application being followed by spraying of 0.2% by weight with respect to the fertilizer, of a vaseline.

The treated fertilizer was packaged in polyethylene bags and was subjected to a clumping test in the clumping module described above. The duration of the stacking was 20 days under a pressure of 1.5 kg/cm$^2$.

At the end of this test, the bags were opened carefully. The clumps were weighed and the hardness of the clumps was measured by means of a dynamometer.

The results of these measurements are collected in Table B.

TABLE B

| Treatment | | % clumping | Hardness of clumps | Clumping Index |
|---|---|---|---|---|
| Clay doped with 3% amine | 0.6% | 88 | 62 | 5500 |
| Mineral oil (prior art) | 0.2% | | | |
| Clay | 0.3% | 35 | 46.5 | 1630 |
| Composition A (according to the invention) | 0.15% | | | |
| Clay | 0.3% | 71 | 59 | 4200 |
| Composition B | 0.15% | | | |
| Clay | 0.3% | 50 | 47 | 2400 |
| Composition C | 0.15% | | | |
| Untreated control | | 100 | 160 | 16000 |

The results collected in Table B show that it is possible to reduce the dose of coating agent by one half with respect to an anti-clumping agent constituted by a commercial doped charge and that the combination of anti-clumping agents according to the invention shows potentiation of the anti-clumping properties of the two constituent active materials of the combination.

EXAMPLE 2

An anti-clumping treatment is applied to an ammonium nitrate titrating 33.5% of nitrogen and containing 3% of ammonium sulphate in the mass. The fertilizer was treated at 30° C.

Four tests were carried out in which the anti-clumping treatment consisted respectively of spraying at 80° C. of 0.1% by weight with respect to the fertilizer of anti-clumping compositions D, E and F described below, and an anti-clumping composition according to the prior art constituted by a commercial aminated oil containing 18% of stearylamine and sprayed under the same conditions.

Composition D was constituted:
in the proportion of 19% by weight of the product of neutralization with stearylamine of a mixture containing 63% by weight of a 1.3-isopropylnaphthalenesulfonic acid and 37% by weight of an acid laurylphosphate (mixture of 50/50 of mono- and diesters),
in the proportion of 6% by weight of stearic acid,
in the proportion of 50% by weight of a mineral oil,
in the proportion of 25% by weight of a macrocrystalline wax.

Composition E was constituted:
in the proportion of 19% by weight of the product of neutralization of a 1.3-isopropyl naphthalenesulfonic acid with stearylamine,
in the proportion of 6% by weight of stearic acid,
in the proportion of 50% by weight of a mineral oil and
in the proportion of 25% by weight of a macrocrystalline wax.

Composition F was constituted:
in the proportion of 19% by weight of the product of neutralization of an acid laurylphosphate (mixture 50/50 of mono- and diesters) with stearylamine,
in the proportion of 6% by weight of stearic acid,
in the proportion of 50% by weight of a mineral oil and
proportion of 25% by weight of a macrocrystalline wax.

The compositions D, E and F were applied in the proportion of 0.1% by weight with respect to the fertilizer.

The treated fertilizer was subjected to the test described in Example 1 and the same measurements were carried out.

The results of these measurements are collected in Table C.

TABLE C

| Treatment | % clumping | Hardness of clumps | Clumping Index |
|---|---|---|---|
| Composition D (according to the invention) | 6 | 20 | 120 |
| Composition E | 50 | 55 | 2750 |
| Composition F | 27 | 45 | 1200 |
| Commercial aminated oil (according to prior art) | 25 | 39 | 1000 |
| Untreated control | 100 | 200 | 20000 |

The results collected in Table C show that the combination according to the invention shows a potentiation of the anti-clumping properties with respect to the properties of each of the constituent agents of the combination taken separately and formulated in the same manner.

EXAMPLE 3

An anti-clumping treatment was applied to an NPK complex fertilizer of formula 16.10.5 known to be difficult to anti-clump and which has a temperature of 35° C.

Recourse was had to a composition G according to the invention constituted
in the proportion of 10% by weight of the product of neutralization with stearylamine of a mixture containing 75% by weight of 1.3-isopropylnaphthalene sulfonic acid and 25% by weight of an acid alkylphosphate (50/50 molar mixture of mono- and diesters) of which the alkyl portion was constituted by a chain comprising essentially a mixture of C16 et en C18,
in the proportion of 90% by weight of a mineral oil.

There was first applied, in a proportion of 0.3% by weight with respect to the fertilizer, a clay and then sprayed at 80° C. the composition G in the proportion of 0.2% by weight with respect to the fertilizer.

Two comparative experiments were carried out by means of two compositions according to the prior art, denoted by "Control N°1" and "Control N°2".

Control N°1 was an alkylaryl sulfonate marketed by Compagnie Francaise de Produits Industriels under the trademark "GALORYL ATH 24". It was employed within the scope of a treatment which consisted of coating by means of 0.7% by weight with respect to the fertilizer of a clay, followed by spraying at 80° C. of 0.2% by weight with respect to the fertilizer of a mixture containing 15% by weight of Control N°1 in heavy fuel N°2.

Control N°2 was constituted by vaseline. It was employed within the scope of a treatment which consisted of a coating in a proportion of 0.5% by weight with respect to the fertilizer of a clay doped with 3% by weight of a composition based on stearylamine, followed by spraying at 80° C. of 0.2% by weight with respect to the fertilizer, of said control.

The treated fertilizer was subjected to the test described in Example 1 and the same measurements were carried out.

The results of these measurements are collected in Table D.

TABLE D

| Treatment | | % clumping | Hardness of clumps | Clumping Index |
|---|---|---|---|---|
| Control n°1 | 0.7% clay<br>0.03% GALORYL ATH 24<br>0.17% heavy fuel | 74 | 96 | 7100 |
| Control n°2 | 0.5% doped clay<br>0.2% vaseline | 95 | 85 | 8070 |
| Composition G | 0.3% clay<br>0.2% composition G | 50 | 43 | 2150 |
| Untreated control | | 100 | 20 | 20000 |

The results collected in Table D show that, on a fertilizer extremely difficult to anti-clump, the invention enables the amounts of mineral oil coating to be reduced, hence the ratio of rescattering of dust significantly reduced whilst improving the anti-clumping performance.

Anti-clumping composition G does not include macrocrystalline wax.

EXAMPLE 4

An anti-clumping treatment is applied to an NPK granulated complex fertilizer of formula 15.12.24 by using:
- anti-clumping compositions H and I according to the invention,
- the anti-clumping composition B of Example 1,
- an anti-clumping composition J comprising the other of the two agents entering into the constitution of the anti-clumping product of compositions H and I,
- an anti-clumping composition according to the prior art.

The anti-clumping composition H was constituted
in the proportion of 15% by weight of the product of neutralization with stearylamine of a mixture containing 65% by weight of 1.3-isopropylnaphthalene sulfonic acid and 35% by weight of an acid alkylphosphate defined in composition J,
in the proportion of 60% by weight of a mineral oil and
in the proportion of 25% by weight of a macrocrystalline wax.

The anti-clumping composition I is constituted in the same manner as composition H, with the slight difference that the 60% by weight of mineral oil are replaced by a mixture of 57% of mineral oil and 3% of aluminum stearate.

The anti-clumping composition J is constituted
in the proportion of 15% by weight of the product of neutralization with stearylamine of an acid alkylphosphate (50/50 molar mixture of mono- and diesters) of which the alkyl portion is constituted by a chain comprising essentially a mixture of $C_8$ and of $C_{10}$,
in the proportion of 60% by weight of a mineral oil and
in the proportion of 25% by weight of a macrocrystalline wax.

The anti-clumping compositions B, H, I et J are applied by spraying at 80° C. in the proportion of 0.15% by weight with respect to the fertilizer, this application being preceded by the application of an inert clay in the proportion of 0.3% by weight with respect to the fertilizer.

The composition according to the prior art is constituted by a doped clay with 3% by weight of stearylamine.

It is applied in the proportion of 0.6% by weight with respect to the fertilizer, this application being followed by the spraying of vaseline in the proportion of 0.2% by weight with respect to the fertilizer.

The treated fertilizer is packaged in polyethylene bags and is subjecteed to a clumping test in the clumping module described above. The duration of the stacking is 40 days under a pressure of 1.5 kg/cm².

At the end of this test, the polyethylene bags are opened carefully. The clumps are weighed and the hardness of the clumps is measured by means of a dynanometer.

The results of these measurements are collected in Table E.

TABLE E

| Treatment | | % clumping | Hardness of clumps | Clumping Index |
|---|---|---|---|---|
| Doped clay with 3% amine | 0.6% | 89 | 79 | 7030 |
| Mineral oil (prior art) | 0.2% | | | |
| Clay | 0.3% | 62 | 52 | 3220 |
| Composition B | 0.15% | | | |
| Clay | 0.3% | 42 | 46 | 1930 |
| Composition H (according to the invention) | 0.15% | | | |
| Clay | 0.3% | 31 | 51 | 1580 |
| Composition I (according to the invention) | 0.15% | | | |
| Clay | 0.3% | 48 | 52 | 2500 |
| Composition J | 0.15% | | | |

This example illustrates the pontentiation of the anti-clumping properties of the two active materials constituting the composition associated with aluminum stearate.

EXAMPLE 5

An anti-clumping treatment is applied to ammonium nitrate titrating 33.3% and containing 4% of ammonium sulphate in the mass. The fertilizer is treated at 30° C.

Four trials were carried out in which the anti-clumping treatment consisted respectively of a spraying at 80° C. of 0.1% by weight with respect to the fertilizer of the anti-clumping compositions K, L and M described below, and of an anti-clumping composition according to the prior art constituted by a commercial aminated oil containing 18% of stearylamine and sprayed under the same conditions.

The composition K according to the invention is constituted:
in the proportion of 22% by weight of the product of neutralization with stearylamine of a mixture containing 55% by weight of a tributyl-naphthalenesulfonic acid and 45% by weight of an acid stearyl-phosphate (50/50 mixture of mono- and diesters),
in the proportion of 10% by weight of stearic acid,
in the proportion of 45% by weight of a paraffin oil,
in the proportion of 23% by weight of a macrocrystalline wax.

The composition L comprises one of the two agents entering into the constitution of anti-clumping product of the compositon K.

It is constituted:
in the proportion of 22% by weight of the product of neutralization of a tributyl-naphthalenesulfonic acid with stearylamine,
in the proportion of 10% by weight of stearic acid,
in the proportion of 45% by weight of a paraffin oil,
in the proportion of 23% by weight of a macrocrystalline wax.

The composition M comprises the other of the two agents entering into the constitution of the anti-clumping product of composition K. It is constituted:
in the proportion of 22% by weight of the product of neutralization of an acid stearylphosphate (50/50 mixture of mono- and diesters) with stearylamine,
in the proportion of 10% by weight of stearic acid,
in the proportion of 45% by weight of a paraffin oil,
in the proportion of 23% by weight of a macrocrystalline wax.

The treated fertilizer was subjected to the test described in Example 1 and the same measurements were carried out. The duration of stacking was, in this case, 45 days under a pressure of 1 kg/cm$^2$.

The results of these measurements are collected in

TABLE F

| Treatment | % clumping | Hardness of clumps | Clumping Index |
|---|---|---|---|
| Composition K (according to the invention) | 45 | 30 | 1350 |
| Composition L | 95 | 80 | 7600 |
| Composition M | 95 | 72 | 6840 |
| Commercial aminated oil (according to prior art) | 67 | 32 | 2140 |
| Untreated control | 100 | 200 | 20000 |

The results collected in Table F show that the combination according to the invention causes the appearance of a potentiation of the anti-clumping properties with respect to the properties of each of the constituent agents of the combination taken separately and formulated in the same manner.

EXAMPLE 6

An anti-clumping treatment is applied to an NPK complex fertilizer of formula 15.11.22 known to be difficult to anti-clump and which is at a temperature of 35° C. using, by spraying with a proportion of 0.1% by weight with respect to the treated fertilizer, an anti-clumping composition N according to the invetnion and an anti-clumping composition according to the prior art constituted by a doped clay in the proportion of 3% by weight of stearylamine.

The composition N is constituted:
in the proportion of 15% by weight of the product of neutralization with stearylamine of a mixture containing 50% of 1.3-isopropyl-naphthalenesulfonic acid and 50% of an acid laurylphosphate (50/50 molar mixture of mono- and diesters),
in the proportion of 60% by weight of a mineral oil and
in the proportion of 25% by weight of a macrocrystalline wax.

TABLE G

| Treatment | % clumping | Hardness of clumps | Clumping Index |
|---|---|---|---|
| Composition N (according to the invention) | 37 | 35 | 1300 |
| Control { 0.6% doped clay 0.2% vaseline | 44 | 47 | 2070 |
| Untreated control | 100 | 160 | 16000 |

This example illustrates the fact that a composition according to the invention permits the elimination of the mineral coating.

Advantageously, this remarkable anti-clumping performance is accompanied by suppression of the rescattering of the dust.

EXAMPLE 7

An anti-clumping treatment is applied to a urea-based fertilizer granulated with a charge in the mass by using an anti-clumping composition O according to the invention and an anti-clumping composition according to the prior art.

The anti-clumping composition O is constituted:
in the proportion of 19% by weight of the product of neutralization with stearylamine of a mixture containing 75% of the 1.3-isopropyl-naphthalenesulfonic acid and 25% of an acid laurylphosphate (50/50 molar mixture of mono- and diesters),
in the proportion of 5% by weight of stearic acid,
in the proportion of 53% by weight of a mineral oil and
in the proportion of 23% by weight of a macrocrystalline wax.

The anti-clumping composition according to the prior art is constituted by a commercial aqueous solution of an alkylsulfate associated with soluble polymer of the ethylene vinyl acetate type.

The anti-clumping compositions are sprayed on the fertilizer in the proportion of 0.1% by weight with respect to the fertilizer.

The test is that described in Example 1. The duration of stacking was 20 days under a pressure of 1 kg/cm$^2$.

TABLE H

| Treatment | % clumping | Hardness of clumps | Clumping Index |
|---|---|---|---|
| Solution according to the prior art | 100 | 47 | 4700 |
| Composition O (according to the invention) | 30 | 22 | 660 |
| Untreated control | 100 | 60 | 6000 |

This example illustrates the anti-clumping properties of the composition according to the invention.

EXAMPLE 8

The composition K described in Example 5, and the formulae called "coating mixture A, B and C" described in EP Patent 113 687, were tested comparatively.

The tests were carried out on a 33.5% ammonium nitrate containing 4% of ammonium sulphate.

The treatment consisted of spraying at 80° C. of 0.1% by weight with respect to the fertilizer of different anti-clumping compositions.

The treated fertilizer was subjected to the test described in Example 1 and the same measurements were carried out. The duration of stacking was, in this case, 45 days under a pressure of 1 kg/cm$^2$.

The results are collected in Table I.

TABLE I

| Treatment | % clumping | Hardness of clumps | Clumping Index |
|---|---|---|---|
| Composition K (according to the invention) | 45 | 50 | 1350 |
| Coating mixture A | 100 | 100 | 10000 |
| Coating mixture B | 100 | 100 | 10000 |
| Coating mixture C | 100 | 100 | 10000 |

This example illustrates the decisive superiority of the anti-clumping compositions according to the invention with respect to the prior art on a fertilizer having a very strong tendency to setting solid.

We claim:

1. Anti-clumping product for mixing with compounds essentially used as simple or complex fertilizers for preventing clumping consisting of a combination of 15 to 85% of at least one amine salt of an alkylaryl-sulfonic acid and of 85 to 15% of at least one amine salt of an acid phosphate ester, wherein the alkylaryl-sulfonic acid is selected from the group consisting of mono-, di- or trisulfonic acids in which the alkylaryl portion is selected from the group consisting of mono- and polyalky-substituted benzene and naphthalene and wherein the acid phosphates esters correspond to a formula selected from the group consisting of

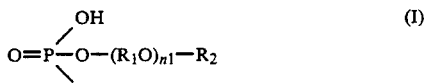

and

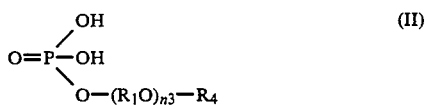

in which
R$_1$ represent an alkylene group having from 2 to 4 carbon atoms,
R$_2$, R$_3$ and R$_4$ represent an alkyl group having from 8 to 20 carbon atoms or an alkylaryl group of which the akylated portion has from 8 to 12 carbon atoms, and
n$_1$, n$_2$ and n$_3$ represent a number from 0 to 15.

2. Anti-clumping product according to claim 1, wherein said at least one amine salt of an alkylaryl-sulfonic acid is present in an amount of 30 to 70% and said at least one amine salt of an acid phosphate ester is present in an amount of 70 to 30%.

3. Anti-clumping product according to claim 1, wherein n$_1$, n$_2$ and n$_3$ represent a number from 0 to 5.

4. Anti-clumping composition for use essentially with a simple or complex fertilizer, comprising 5–35 weight-% of at least one anti-clumping product according to claim 1, further comprising an excess of amine.

5. Anti-clumping product according to claim 4, comprising an excess of amine which is less than 25% molar.

6. Anti-clumping product according to claim 1, wherein the alkylaryl-sulfonic acid is 1,3-isopropyl-naphthalene-sulfonic acid.

7. Anti-clumping product according to claim 1, wherein the amine salt is derived from an amine selected from the group consisting of alkylamines, cycloalkylamines, aromatic amines, alkanolamines and their oxyalkylenated homologs.

8. Anti-clumping product according to claim 7, wherein the amine is an alkylamine in which the number of carbon atoms is from 12 to 20.

9. Anti-clumping composition according to claim 7, wherein the amine is a technical stearylamine.

10. Anti-clumping composition for use essentially with a simple or complex fertilizer, comprising 5–35 weight-% of at least one anti-clumping product according to claim 1 and at least one formulation agent selected from the group consisting of mineral oils and the mixtures of the latter with macrocrystalline waxes.

11. Anti-clumping composition for use essentially with a simple or complex fertilizer, comprising 5–35 weight-% of at least one anti-clumping product according to claim 1, at least one other anti-clumping product selected from the group consisting of fatty acids and their salts and at least one formulation agent selected from the group consisting of mineral oils and the mixtures of the latter with macrocrystalline waxes.

12. Anti-clumping composition for use essentially with a simple or complex fertilizer, comprising 5–35 weight-% of at least one anti-clumping product according to claim 1, at least one other anti-clumping product selected from the group consisting of fatty acids having 12 to 20 carbon atoms and their salts and at least one formulation agent selected from the group consisting of mineral oils and the mixtures of the latter with macrocrystalline waxes.

13. Anti-clumping composition for use essentially with a simple or complex fertilizer, comprising 5–35 weight-% of at least one anti-clumping product according to claim 1, another anti-clumping product consisting of stearic acid or its salts and at least one formulation agent selected from the group consisting of mineral oils and the mixtures of the latter with macrocrystalline waxes.

14. Anti-clumping composition for use essentially with a simple or complex fertilizer, comprising 5–35 weight-% of at least one anti-clumping product according to claim 1, at least one other anti-clumping product selected from the group consisting of the salts of calcium, magnesium and aluminum, of stearic acid in which the molar ratio aluminum/stearic acid is close to 2, and at least one formulation agent selected from the group consisting of mineral oils and the mixtures of the latter with macrocrystalline waxes.

15. Anti-clumping composition, comprising:
from 5 to 35% by weight of the anti-clumping product according to claim 1,
from 0 to 10% of a fatty acid or of one of its salts,
from 20 to 90% by weight of a mineral oil and
from 0 to 50% by weight of macrocrystalline wax.

16. A composition comprising a material essentially used as a fertilizer and an anti-clumping product according to claim 1 in an amount from about 0.005% to about 0.05% by weight with respect to the amount of said material.

17. A composition according to claim 16, further including a charge selected from the group consisting of chalk, infusorial earth, talc and clays.

18. A method for treating products essentially used as simple or complex fertilizers in order to prevent the clumping of said products, comprising the steps of:

a) preparing a product for use essentially as a fertilizer including discharging the product from a preparation zone after the product has substantially acquired its final mechanical properties, and
b) substantially at the moment of discharge, incorporating into the product a composition comprising at least one amine salt of an alkylaryl-sulfonic acid and at least one amine salt of an acid phosphate ester and wherein the incorporating step is effected by spraying on the product an amount of the composition of 0.03 to 0.4% by weight with respect to the product and wherein the composition comprises:
a) from 5 to 35% by weight of a combination of 15 to 85% of at least one amine salt of an alkylaryl-sulfonic acid and of 85 to 15% of at least one amine salt of an acid phosphate ester, wherein the alkylaryl-sulfonic acid is selected from the group consisting of mono-, di- or trisulfonic acids in which the alkylaryl portion is selected from the group consisting of mono- or polyalkyl-substituted benzene and naphthalene and wherein the acid phosphates esters correspond to a formula selected from the group consisting of

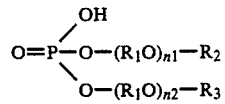 (I)

and

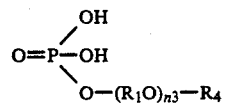 (II)

in which
$R_1$ represents an alkylene group having from 2 to 4 carbon atoms,
$R_2$, $R_3$ and $R_4$ represent an alkyl group having from 8 to 20 carbon atoms or an alkylaryl group of which the alkylated portion has from 8 to 12 carbon atoms, and
$n_1$, $n_2$ and $n_3$ represent a number from 0 to 15;
b) from 0 to 10% of a fatty acid or of one of its salts;
c) from 20 to 90% by weight of a mineral oil; and
d) from 0 to 50% by weight of macrocrystalline wax.

19. A method according to claim 18, wherein the amount of said composition incorporated is from 0.005 to 0.05% by weight with respect the product.

* * * * *